United States Patent
Noda

(10) Patent No.: US 7,072,123 B2
(45) Date of Patent: Jul. 4, 2006

(54) IMAGING LENS INCLUDING THREE LENS COMPONENTS

(75) Inventor: Takayuki Noda, Saitama (JP)

(73) Assignee: Fujinon Corporation, Saitama-Ken (JP)

( * ) Notice: Subject to any disclaimer, the term of this patent is extended or adjusted under 35 U.S.C. 154(b) by 0 days.

(21) Appl. No.: 10/860,134

(22) Filed: Jun. 4, 2004

(65) Prior Publication Data
US 2004/0264003 A1 Dec. 30, 2004

(30) Foreign Application Priority Data
Jun. 24, 2003 (JP) ............................. 2003-179250

(51) Int. Cl.
*G02B 13/18* (2006.01)
*G02B 3/02* (2006.01)
*G02B 15/14* (2006.01)

(52) U.S. Cl. ...................... 359/716; 359/689
(58) Field of Classification Search ................ 359/792, 359/789, 785, 716, 689–690
See application file for complete search history.

(56) References Cited

U.S. PATENT DOCUMENTS

| | | | |
|---|---|---|---|
| 6,259,570 B1 | 7/2001 | Noda | |
| 6,441,971 B1 | 8/2002 | Ning | |
| 6,490,102 B1 * | 12/2002 | Huang | 359/785 |
| 6,624,953 B1 * | 9/2003 | Noda | 359/785 |
| 6,747,810 B1 * | 6/2004 | Sato | 359/792 |
| 6,804,067 B1 * | 10/2004 | Sato | 359/784 |
| 2003/0210475 A1 * | 11/2003 | Shinohara | 359/716 |
| 2004/0061953 A1 | 4/2004 | Sato | |
| 2004/0150893 A1 * | 8/2004 | Shinohara | 359/785 |
| 2005/0094292 A1 * | 5/2005 | Cahall et al. | 359/785 |

FOREIGN PATENT DOCUMENTS

JP 10-301022 11/1998

* cited by examiner

*Primary Examiner*—Alicia M Harrington
(74) *Attorney, Agent, or Firm*—Birch, Stewart, Kolasch & Birch, LLP

(57) ABSTRACT

An imaging lens includes, in order from the object side: a first lens component with a convex surface on the object side near the optical axis; a second lens component with a meniscus shape and a concave surface on the object side near the optical axis; and, a third lens component of positive refractive power with a convex surface on the object side. The first and second lens components may include aspheric surfaces and be made of plastic, and the third lens component may be made of glass. A stop may be placed on the object side of the first lens component or between the first lens component and the second lens component. Each lens component that forms the imaging lens may consist of a lens element. Specified conditions are satisfied in order to reduce aberrations and to insure that a sufficient back focus is provided.

20 Claims, 2 Drawing Sheets

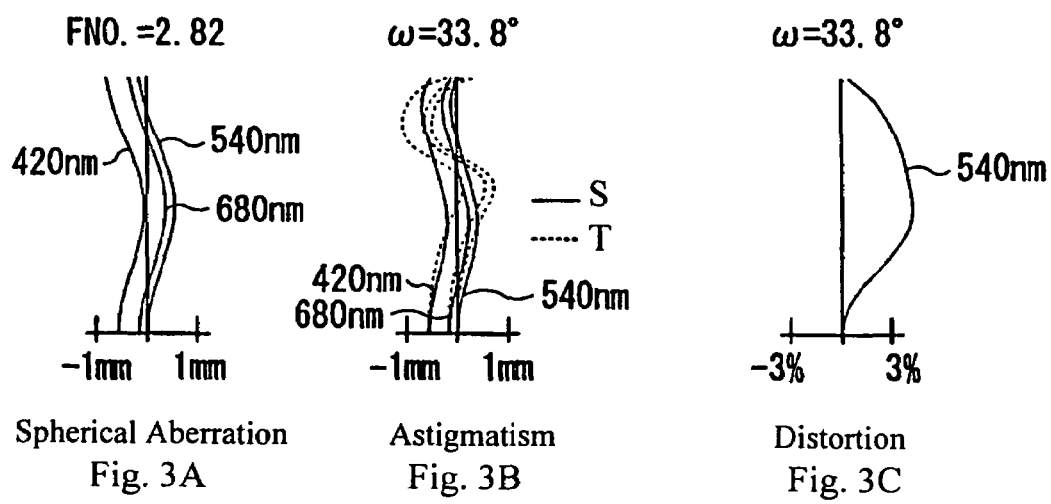
Spherical Aberration
Fig. 3A
Astigmatism
Fig. 3B
Distortion
Fig. 3C
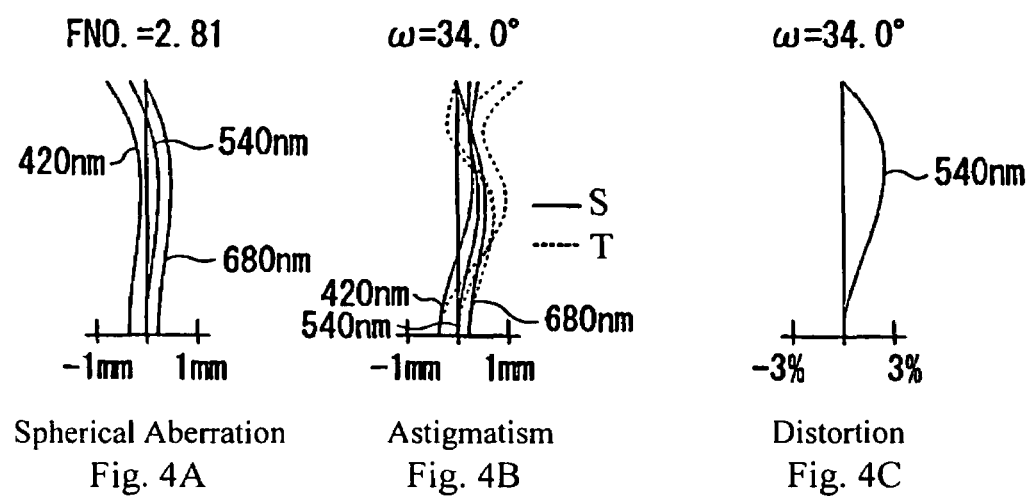
Spherical Aberration
Fig. 4A
Astigmatism
Fig. 4B
Distortion
Fig. 4C

IMAGING LENS INCLUDING THREE LENS COMPONENTS

BACKGROUND OF THE INVENTION

In recent years, various kinds of video cameras have been used that provide still and/or motion pictures and use a solid-state image pickup element such as a CCD (Charge Coupled Device) or a CMOS (Complementary Metal Oxide Semiconductor) at the image pickup plane. The solid-state image pickup elements have become more miniaturized each year by technological advances, and an accompanying miniaturization of the imaging lenses of the video camera has been demanded. Also, there has been an increasing demand for reducing manufacturing costs. Furthermore, the number of pixels in the image has been increasing. This, in turn, has produced a demand for higher resolution and higher performance imaging lenses.

Japanese Laid-Open Patent Application H10-301022 describes exemplary imaging lenses for such cameras that include only three lens elements, including plastic lens elements, in order to achieve miniaturization and reduction of manufacturing costs.

As stated above, recent image pickup elements have been highly miniaturized and provide an increasing number of pixels accompanied by demands for higher resolving power and miniaturization of the imaging lenses used with such image pickup elements. On the other hand, in optical systems employing an image pickup element, optical elements, such as cover glasses and cut-off filters, are often placed between the final image-side lens surface and the image pickup element. This, in turn, requires allowing space in terms of length along the optical axis for such optical elements between the final image-side lens surface and the image pickup element.

In order to realize both miniaturization and adequate length, it is desirable to increase the distance between the final image-side lens surface and the image pickup element relative to the total length of the imaging lens. Although the imaging lenses described in Japanese Laid-Open Patent Application H10-301022 have good overall performance, the imaging lenses of this Japanese published application provide relatively little space for optical members such as cover glasses and cut-off filters. Additionally, these imaging lenses provide relatively narrow field angles of forty-three degrees so improvement in field angles is also desired.

BRIEF SUMMARY OF THE INVENTION

The present invention relates to an imaging lens that provides sufficient length along the optical axis on the image side of the imaging lens elements for optical members, such as a cover glass and cut-off and low-pass filters, relative to the total length of the imaging lens, and provides a bright image and high performance while reducing manufacturing costs and the total length of the imaging lens with a small number of lens elements and lens components. The present invention is applicable to imaging lenses with a wide range of uses, such as those used in cameras for televising images in telephones, in surveillance cameras, in cameras used in portable electronic terminals, in still video cameras, and in scanners for image acquisition by a personal computer.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3C show the spherical aberration, astigmatism, and distortion, respectively, of the imaging lens according to Embodiment 1; and FIGS. 4A–4C show the spherical aberration, astigmatism, and distortion, respectively, of the imaging lens according to Embodiment 2.

DETAILED DESCRIPTION

Figure 1:
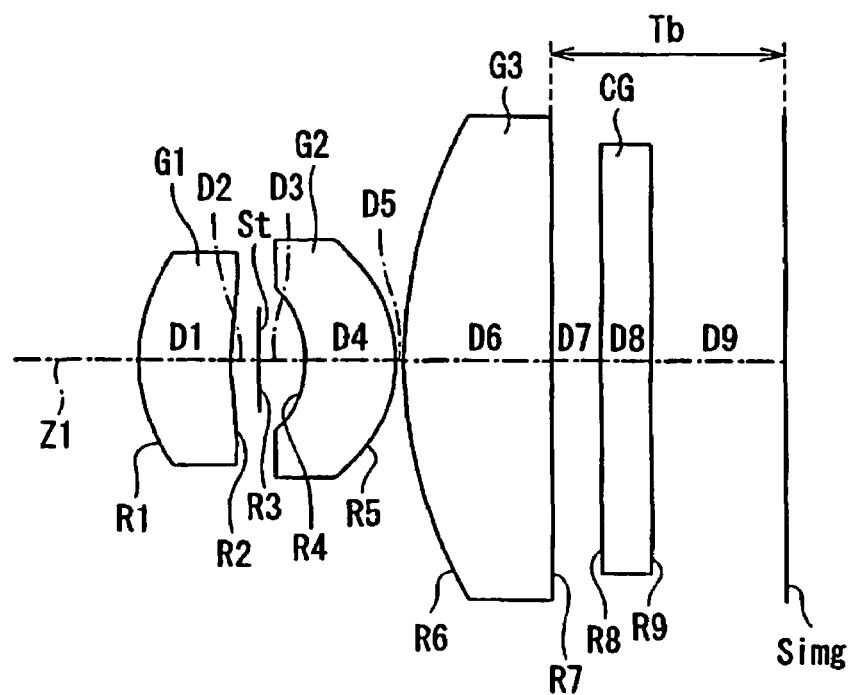
FIG. 1 shows a cross-sectional view of the imaging lens according to Embodiment 1.

A general description of preferred embodiments of the imaging lens of the present invention will now be described with reference to FIG. 1. FIG. 1 shows a cross-sectional view of the imaging lens of Embodiment 1. In FIG. 1, the lens elements of the imaging lens are referenced by the symbols G1 to G3, in order from the object side of the imaging lens along the optical axis Z1. Additionally, a cover glass on the image side of the third lens element G3 is referenced by the symbol CG. The imaging lens further includes a diaphragm stop St that operates as an aperture stop. The radii of curvature of the lens elements G1 to G3, the stop St, and the cover glass CG are referenced by the letter R followed by a number denoting their order from the object side of the imaging lens, from R1 to R9. The on-axis surface spacings along the optical axis Z1 between the surfaces of the optical elements are referenced by the letter D followed by a number denoting their order from the object side of the imaging lens, from D1 to D9.

Definitions of the terms "lens element" and "lens component" as used herein detailed description will now be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The imaging lens of the present invention can be used, for example, in a camera of portable terminal equipment or in a still video camera that uses an image pickup element such as a CCD or CMOS. As shown in FIG. 1, the imaging lens includes, arranged in order from the object side along the optical axis Z1, the first lens element G1, the second lens element G2, and the third lens element G3. An image pickup element, such as a CCD (not shown in the drawings) is arranged at the image plane Simg of the imaging lens. The cover glass CG is arranged at or adjacent to the image plane so as to protect the image-detecting elements of the CCD. In addition to the cover glass CG, other optical elements such as an infrared cut-off filter and/or a low-pass filter may also be arranged between the third lens element G3 and the image plane. In FIG. 1, Tb represents the length along the optical axis, as indicated by the adjacent double-headed horizontal arrow, that provides space for optical elements such as a cover glass CG and cut-off filter.

Preferably, at least one surface of the first lens element G1 and at least one surface of the second lens element G2 has an aspheric shape. It is more preferable that both surfaces of the second lens element G2 be aspheric. By making both surfaces aspheric, it becomes easier to achieve a bright imaging lens. When employing aspheric surfaces for the first lens element G1 and the second lens element G2, it is also preferable that each lens element be made of plastic. Additionally, preferably the third lens element G3 is made of glass. By making the third lens element of glass when plastic lenses are used for the first and second lens elements, it becomes easier to suppress the movement of the image plane due to changes in temperature. By using aspheric surfaces, aberration correction is made easy even though the imaging lens may include only three lens elements. Additionally, by using plastic as the lens material for lens elements with aspheric surfaces, the aspheric surfaces are formed more easily, thereby reducing manufacturing costs.

The lens surfaces that are aspheric are defined using the following equation:

$$Z=[(C \cdot Y^2)/\{1+(1-K \cdot C^2 \cdot Y^2)^{1/2}\}]+\Sigma(A_i \cdot |Y^i|)  \quad \text{Equation (A)}$$

where
  Z is the length (in mm) of a line drawn from a point on the aspheric lens surface at a distance Y from the optical axis to the tangential plane of the aspheric surface vertex,
  C is the curvature (=1/the radius of curvature, R) of the aspheric lens surface on the optical axis,
  Y is the distance (in mm) from the optical axis,
  K is the eccentricity, and
  $A_i$ is the ith aspheric coefficient, and the summation extends over i.

Preferably, the imaging lens of the present invention satisfies the following condition:

$$-1.0 < f/Rg3r < 0.4 \quad \text{Condition (1)}$$

where
  f is the focal length of the imaging lens, and
  Rg3r is the radius of curvature of the image-side lens surface of the third lens element G3.

By satisfying Condition (1), it becomes easier to increase the length Tb between the image-side lens surface of the third lens element G3 and the image plane Simg relative to the total length of the imaging lens. If the shape of the image-side surface of the third lens element G3, which is the image-side lens element surface of the imaging lens, is convex on the image side with a small radius of curvature, it becomes harder to obtain a desirable length Tb that provides space for optical elements such as a cover glass CG and cut-off filter. By satisfying Condition (1), the radius of curvature of the image-side lens surface of the third lens element becomes relatively large (i.e., approaches that of a planar surface), which is preferable in obtaining a desirable length Tb for placing optical elements such as a cover glass and a cut-off filter between the imaging lens and the image plane of the imaging lens.

By using plastic aspheric lens elements for the first and second lens elements and by satisfying Condition (1), not only is a desirable length Tb achieved, but production costs and total length of the imaging lens are reduced. Additionally, a bright and high-performance imaging lens with as few as three lens elements is obtained.

Also, especially when the third lens element G3 is made of glass, it is preferable that the imaging lens be constructed so as to satisfy the following Condition (2):

$$0 < f/(v3 \cdot f3) < 0.03 \quad \text{Condition (2)}$$

where
  f is as defined above,
  v3 is the Abbe number, at the d-line of 587.6 nm, of the third lens element G3, and
  f3 is the focal length of the third lens element G3.

By satisfying Condition (2), correction of chromatic aberration becomes easier. Specifically, chromatic aberration introduced by using plastic as the lens material of lens elements G1 and G2 is corrected by using glass as the lens material of lens element G3 and satisfying Condition (2).

Additionally, especially when both surfaces of the second lens element G2 are aspheric, it is preferable that the imaging lens satisfy the following Condition (3):

$$f3/f < 2 \quad \text{Condition (3)}$$

where f3 and f are as defined above.

Condition (3) relates to the third lens element G3 being high in optical power relative to the first and second lens elements G1 and G2. When the third lens element G3 is made of glass and the first and second lens elements, G1 and G2, are made of plastic, providing much of the optical power of the imaging lens in the third lens element G3 is especially effective in reducing the movement of the image plane due to changes in temperature.

Additionally, it is preferable that the imaging lens satisfy the following Condition (4):

$$0.35 < f1/f < 1.9 \quad \text{Condition (4)}$$

where
  f1 is the focal length of the first lens element G1, and
  f is as defined above.

By satisfying Conditions (3) and (4) above that relate to the powers of the third lens element G3 and the first lens element G1, respectively, it becomes easier to increase the back focal length and the closely associated length Tb in order to provide space for optical elements such as a cover glass and filters.

By satisfying Conditions (1)–(4) related to the powers of the imaging lens and the imaging lens elements, and by choosing appropriate shapes of the lens elements, good aberration correction with only three lens elements may be obtained. With regard to shapes of the lens elements, the object-side surface of the first lens element G1 is convex near the optical axis. The term "near the optical axis" is herein defined as a central region that surrounds the optical axis but excludes a substantial peripheral region surrounding the central region. At the peripheral region, the curvature of the lens surface and the refractive power of the lens element may or may not be of the same magnitude or even of the same sign, that is, either positive or negative in sign, as at the central region that is near the optical axis. In particular, the curvature and refractive power may vary based on the lens surface being aspheric.

The second lens element G2 has a meniscus shape with its concave surface on the object side. The third lens element G3 has positive refractive power and a convex lens surface on its object side.

An imaging lens constructed as described above may include a small number of lens elements, be compact while allowing space for optical elements such as a cover glass and filters, and be produced at low cost. In addition, through the use of particular aspheric surfaces, through the use of certain lens element shapes and lens element materials, and by satisfying various requirements as described above, an imaging lens that has a bright image and achieves a high performance can be provided.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1. Listed in the bottom portion of Table 1 are the focal length f, the f-number $F_{NO}$, and the maximum field angle $2\omega$.

TABLE 1

| # | R | D | N | ν |
|---|---|---|---|---|
| 1* | 52.941 | 25.80 | 1.50842 | 56.3 |
| 2 | 131.128 | 7.57 | | |
| 3 | ∞ (stop) | 13.18 | | |
| 4* | −26.712 | 25.23 | 1.50842 | 56.3 |
| 5* | −33.867 | 2.24 | | |
| 6 | 133.027 | 42.06 | 1.77250 | 49.6 |
| 7 | ∞ | 14.02 | | |
| 8 | ∞ | 14.02 | 1.51872 | 64.2 |
| 9 | ∞ | 33.08 | | |
| | f = 100 mm | $F_{NO}$ = 2.82 | $2\omega$ = 67.6° | |

The surfaces with a * to the right of the surface number in Table 1 are aspheric lens surfaces, and the aspheric surface shape is expressed by Equation (A) above.

Table 2 below lists the values of the constants K, and $A_3$–$A_{14}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | 1.00000 | 4.92991E−2 | −7.83187E−2 | 2.50919E−2 | 1.31058E−1 |
| 4 | 1.00000 | 0 | −1.21244E−1 | 0 | 1.22558 |
| 5 | 1.00000 | 2.01572E−1 | −4.01059E−1 | −4.68207E−2 | 8.91352E−1 |

| | $A_7$ | $A_8$ | $A_9$ | $A_{10}$ |
|---|---|---|---|---|
| 1 | −6.81459E−2 | −2.74598E−1 | −3.66954E−2 | 1.00611 |
| 4 | 0 | −7.11993 | 0 | 2.03640E+1 |
| 5 | 1.46585E−1 | −1.40465 | −3.21433E−1 | 1.06408 |

| | $A_{11}$ | $A_{12}$ | $A_{13}$ | $A_{14}$ |
|---|---|---|---|---|
| 1 | 2.59926E−1 | −3.39517 | 3.52483 | −1.12132 |
| 4 | 0 | −2.85987E+1 | 0 | 1.53995E+1 |
| 5 | 1.49572 | −1.98647 | 2.03867E−1 | 2.59759E−1 |

EMBODIMENT 1

FIG. 1 shows Embodiment 1 of the present invention. As shown in FIG. 1, in Embodiment 1, the first lens element G1 has a meniscus shape and the stop St is between the first lens element G1 and the second element G2. Additionally, Embodiment 1 satisfies the following Condition (5):

$$1.0 < f1/f < 1.9 \qquad \text{Condition (5)}$$

where f1 and f are as defined above. When the stop St is placed between the first lens element G1 and the second lens element G2, it becomes easier to obtain a bright image by satisfying Condition (5).

Table 1 below lists the surface number #, in order from the object side, the radius of curvature R (in mm) of each surface near the optical axis, the on-axis surface spacing D (in mm), as well as the refractive index N and the Abbe number ν (both at the d-line of 587.6 nm) of each optical element for The imaging lens of Embodiment 1 satisfies Conditions (1)–(5) above, as set forth in Table 3 below.

TABLE 3

| Condition No. | Condition | Value |
|---|---|---|
| (1) | −1.0 < f/Rg3r < 0.4 | 0 |
| (2) | 0 < f/(ν3/f3) < 0.03 | 0.0117 |
| (3) | f3/f < 2 | 1.721 |
| (4) | 0.35 < f1/f < 1.9 | 1.572 |
| (5) | 1.0 < f1/f < 1.9 | 1.572 |

In Embodiment 1, the length Tb, shown in FIG. 1, equals the back focal length of the imaging lens when the thickness of the cover glass CG is set to zero with the image-side surface of the third lens element G3 being planar. With the focal length f normalized to the value of one hundred millimeters in Embodiment 1, the back focal length of the imaging lens when the thickness of the cover glass CG is set to zero equals 57.1 mm.

FIGS. 3A–3C show the spherical aberration, astigmatism, and distortion, respectively, of the imaging lens according to Embodiment 1. In FIG. 3A, the spherical aberration is shown for wavelengths of 540 nm, 420 nm, and 680 nm. In FIG. 3B, the astigmatism is shown at these same three wavelengths for both the sagittal image surface S and the tangential image surface T. In FIG. 3C, the distortion is shown at 540 nm. The half-field angle ω for FIGS. 3B and 3C is 33.8°.

As is clear from the lens data and aberration curves discussed above, in Embodiment 1 the various aberrations are favorably corrected, and performance capabilities that are suitable for a bright, compact, high performance imaging lens can be obtained.

EMBODIMENT 2

Figure 2:
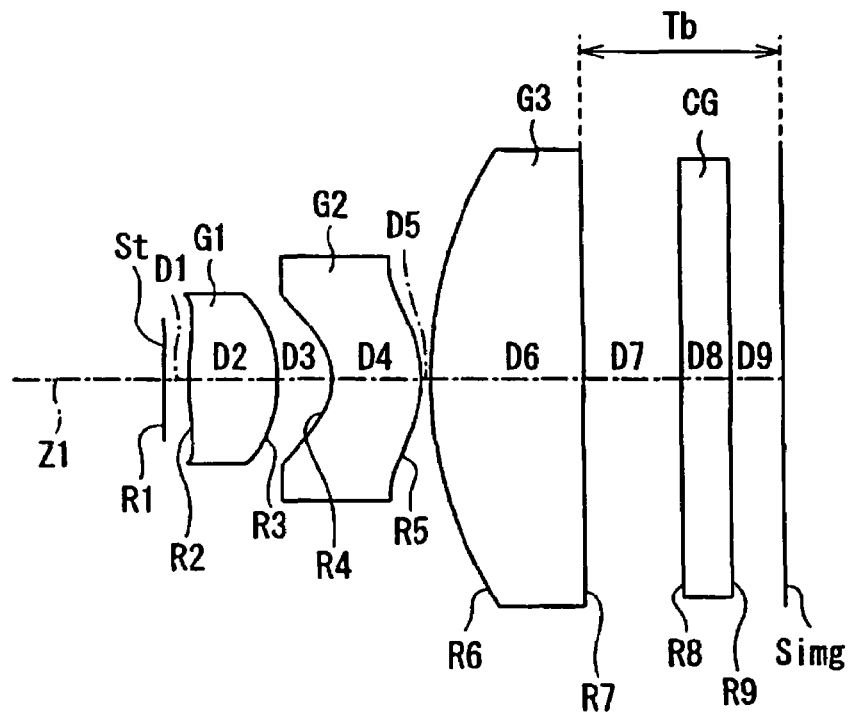
FIG. 2 shows a cross-sectional view of the imaging lens according to Embodiment 2.

FIG. 2 shows Embodiment 2 of the present invention. Embodiment 2 is similar to Embodiment 1 and therefore only the differences between Embodiment 2 and Embodiment 1 will be explained. Whereas in the imaging lens of Embodiment 1 the stop St is positioned between the first lens element G1 and the second lens element G2, in the imaging lens of Embodiment 2 the stop St is positioned on the object side of the first lens element G1. Additionally, Embodiment 2 satisfies the following Condition (6):

$0.35 < f1/f < 1.0$    Condition (6)

where f1 and f are as defined above.

With the stop St placed on the object side of the first lens element G1, it becomes easier to obtain a bright image by satisfying Condition (6).

Additionally, while in Embodiment 1 the first lens element G1 has a meniscus shape, in Embodiment 2, the first lens element G1 has a biconvex shape at least near the optical axis. When making the object-side surface of the first lens element G1 to be aspheric, it is preferable to construct the object-side surface so that it has a convex shape near the optical axis and changes to a concave shape toward the periphery. Also, when making the image-side surface of the second lens element G2 to be aspheric, it is preferable to construct the image-side surface so that it has a convex shape near the optical axis and changes to a concave shape toward the periphery. With this design, good aberration correction can be achieved.

Table 4 below lists the surface number #, in order from the object side, the radius of curvature R (in mm) of each surface near the optical axis, the on-axis surface spacing D (in mm), as well as the refractive index N and the Abbe number ν (both at the d-line) of each optical element for Embodiment 2. Listed in the bottom portion of Table 4 are the focal length f, the f-number $F_{NO}$, and the maximum field angle 2ω.

TABLE 4

| # | R | D | N | ν |
|---|---|---|---|---|
| 1 | ∞ (stop) | 7.04 | | |
| 2* | 102.557 | 25.34 | 1.53039 | 55.2 |
| 3* | −54.191 | 16.05 | | |
| 4* | −19.060 | 25.62 | 1.58364 | 30.3 |
| 5* | −37.325 | 2.82 | | |
| 6 | 126.252 | 44.77 | 1.71300 | 53.8 |
| 7 | ∞ | 18.00 | | |
| 8 | ∞ | 14.13 | 1.54212 | 59.4 |
| 9 | ∞ | 10.16 | | |
| f = 100 mm | | $F_{NO}$ = 2.81 | 2ω = 68.0° | |

The surfaces with a * to the right of the surface number in Table 4 are aspheric lens surfaces, and the aspheric surface shape is expressed by Equation (A) above.

Table 5 below lists the values of the constants K, and $A_2$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_2$ | $A_3$ | $A_4$ | $A_5$ | $A_6$ | $A_7$ | $A_8$ | $A_9$ | $A_{10}$ |
|---|---|---|---|---|---|---|---|---|---|---|
| 2 | 1.00000 | −0.81934E−4 | 0 | −0.12208E−5 | 0 | −0.14862E−7 | 0 | 0.26308E−10 | 0 | −0.37054E−13 |
| 3 | 1.00000 | 0 | 0 | −0.64467E−5 | 0 | −0.29551E−8 | 0 | 0.69281E−11 | 0 | −0.71618E−14 |
| 4 | 0.06100 | 0 | 0 | −0.52026E−5 | 0 | 0.28839E−7 | 0 | −0.20230E−10 | 0 | 0.59253E−14 |
| 5 | −5.62700 | 0 | 0 | −0.99438E−5 | 0 | 0.13874E−7 | 0 | −0.55565E−11 | 0 | 0.82118E−15 |

The imaging lens of Embodiment 2 satisfies Conditions (1)–(4) and (6) above, as set forth in Table 6 below.

TABLE 6

| Condition No. | Condition | Value |
|---|---|---|
| (1) | −1.0 < f/Rg3r < 0.4 | 0 |
| (2) | 0 < f/(ν3/f3) < 0.03 | 0.0094 |
| (3) | f3/f < 2 | 1.971 |
| (4) | 0.35 < f1/f < 1.9 | 0.707 |
| (6) | 0.35 < f1/f < 1.0 | 0.707 |

In Embodiment 2, the length Tb (shown in FIG. 2) equals the back focal length of the imaging lens when the thickness of the cover glass CG is set to zero with the image-side surface of the third lens element G3 being planar. With the focal length f normalized to the value of one hundred millimeters in Embodiment 2, the back focal length of the imaging lens when the thickness of the cover glass CG is set to zero is 52.52 mm.

FIGS. 4A–4C show the spherical aberration, astigmatism, and distortion, respectively, of the imaging lens according to Embodiment 2. In FIG. 4A, the spherical aberration is shown for wavelengths of 540 nm, 420 nm, and 680 nm. In FIG. 4B, the astigmatism is shown at these same three wavelengths for both the sagittal image surface S and the tangential image surface T. In FIG. 4C, the distortion is shown at 540 nm. The half-field angle ω for FIGS. 4B and 4C is 34.0°.

As is clear from the lens data and aberration curves discussed above, in Embodiment 2 the various aberrations are favorably corrected, and performance capabilities that are suitable for a bright, compact, high performance imaging lens can be obtained.

The invention being thus described, it will be obvious that the same may be varied in many ways. For instance, values such as the radius of curvature R of each of the lens elements, the surface spacing D, the refractive index N, as well as the Abbe number ν, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens comprising, arranged along an optical axis in order from the object side:
    a first lens component having positive refractive power, having a convex surface on the object side near the optical axis, being made of plastic, and having at least one aspheric surface;
    a second lens component having a meniscus shape with a concave surface on the object side, being made of plastic, and having at least one aspheric surface;
    a third lens component having positive refractive power and a convex surface on the object side;
wherein
    the following condition is satisfied:

$-1.0 < f/Rg3r < 0.4$ where
    f is the focal length of the imaging lens, and
    Rg3r is the radius of curvature of the image-side lens surface of the third lens component.

2. The imaging lens of claim 1, wherein the third lens component is made of glass and the following condition is satisfied:

$0 < f/(\nu 3 \cdot f3) < 0.03$ where
    ν3 is the Abbe number, at the d-line of 587.6 nm, of the third lens component, and
    f3 is the focal length of the third lens component.

3. The imaging lens of claim 2, wherein both surfaces of the second lens component are aspheric and the following condition is satisfied:

$f3/f < 2$.

4. The imaging lens of claim 3, and further comprising a stop between the first lens component and the second lens component, and wherein the following condition is satisfied:

$1.0 < f1/f < 1.9$ where
    f1 is the focal length of the first lens component.

5. The imaging lens of claim 2, wherein the first lens component, the second lens component, and the third lens component are arranged in that order along the optical axis from the object side without any intervening lens element.

6. The imaging lens of claim 5, wherein the imaging lens is formed of only three lens components.

7. The imaging lens of claim 6, wherein the imaging lens is formed of only three lens elements.

8. The imaging lens of claim 2, wherein each of the first, second, and third lens components consists of a lens element.

9. The imaging lens of claim 1, wherein the first lens component, the second lens component, and the third lens component are arranged in that order along the optical axis from the object side without any intervening lens element.

10. The imaging lens of claim 9, wherein the imaging lens is formed of only three lens components.

11. The imaging lens of claim 10, wherein the imaging lens is formed of only three lens elements.

12. The imaging lens of claim 1, wherein each of the first, second, and third lens components consists of a lens element.

13. An imaging lens comprising, arranged along an optical axis in order from the object side:
    a first lens component having a convex surface on the object side near the optical axis;
    a second lens component having a meniscus shape and having a concave surface on the object side;
    a third lens component having positive refractive power, having a convex surface on the object side, and being made of glass;
wherein
    the following conditions are satisfied:

$f3/f < 2$ $0.35 < f1/f < 1.9$ where
    f3 is the focal length of the third lens component,
    f1 is the focal length of the first lens component, and
    f is the focal length of the imaging lens.

14. The imaging lens of claim 13, and further comprising a stop between the first lens component and the second lens component, and wherein the following condition is satisfied:

$1.0 < f1/f < 1.9$.

15. The imaging lens of claim 13, and further comprising a stop on the object side of the first lens component, and wherein the following condition is satisfied:

$0.35 < f1/f < 1.0$.

16. The imaging lens of claim 13, wherein the first lens component, the second lens component, and the third lens component are arranged in that order along the optical axis from the object side without any intervening lens element.

17. The imaging lens of claim 16, wherein the imaging lens is formed of only three lens components.

18. The imaging lens of claim 17, wherein the imaging lens is formed of only three lens elements.

19. The imaging lens of claim 13, wherein each of the first, second, and third lens components consists of a lens element.

20. An imaging lens comprising, arranged along an optical axis in order from the object side:
    a first lens component having positive refractive power, having a convex surface on the object side near the optical axis, being made of plastic, and having at least one aspheric surface;
    a second lens component having a meniscus shape with a concave surface on the object side, being made of plastic, and having at least one aspheric surface;

a third lens component having positive refractive power, having a convex surface on the object side, and being made of glass;

wherein the following conditions are satisfied:

$-1.0 < f/Rg3r < 0.4$ $f3/f < 2$ $0.35 < f1/f < 1.9$ where f is the focal length of the imaging lens, Rg3r is the radius of curvature of the image-side lens surface of the third lens component, f3 is the focal length of the third lens component, and f1 is the focal length of the first lens component.

* * * * *